United States Patent
Chalon

(10) Patent No.: US 7,213,070 B2
(45) Date of Patent: May 1, 2007

(54) METHOD OF BROKERING NETWORK SERVICES

(75) Inventor: Denis Chalon, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1026 days.

(21) Appl. No.: 10/349,500

(22) Filed: Jan. 21, 2003

(65) Prior Publication Data

US 2003/0177181 A1    Sep. 18, 2003

(30) Foreign Application Priority Data

Jan. 21, 2002    (EP)    .................................. 02354011

(51) Int. Cl.
 *G06F 15/16* (2006.01)
(52) U.S. Cl. ...................................... 709/226; 709/229
(58) Field of Classification Search ........ 709/200–203, 709/217–229
See application file for complete search history.

(56) References Cited

U.S. PATENT DOCUMENTS 6,633,757 B1 *  10/2003  Hermann et al. ........ 455/414.1

2002/0029277 A1*  3/2002  Simpson-Young et al. .. 709/228
2003/0208691 A1*  11/2003  Smart et al. ................ 713/201

FOREIGN PATENT DOCUMENTS

WO    01/86419    11/2001

* cited by examiner

*Primary Examiner*—Moustafa M. Meky
(74) *Attorney, Agent, or Firm*—Ladas & Parry LLP

(57) ABSTRACT

A method of brokering network services by identifying a service which is complementary to a first service, the first service having an associated first service description comprising first service identification information identifying the service offered and first interface type information, the first interface type information comprising at least one of an input format accepted by the first service and an output format generated by the first service, the method comprising the steps of; identifying a second service having an associated second service description comprising second service identification information identifying the service offered and second interface type information which is complementary to the first interface type information, and modifying the first service description in accordance with the second service description.

13 Claims, 3 Drawing Sheets

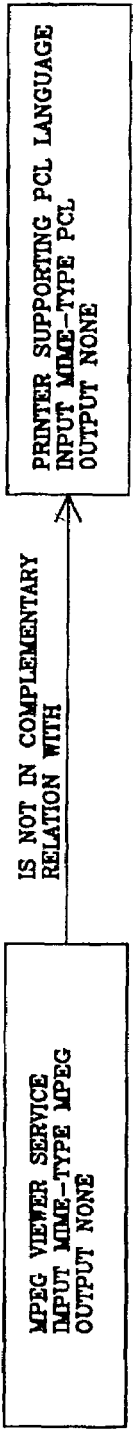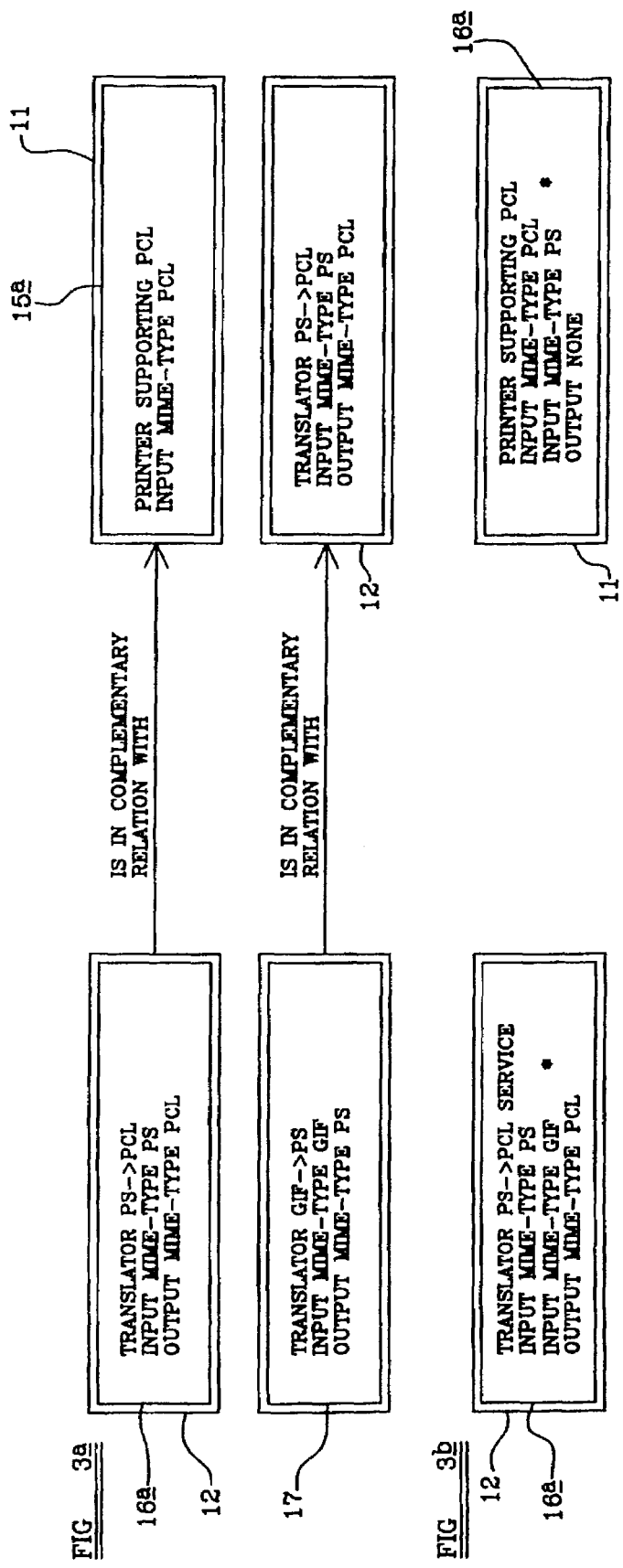

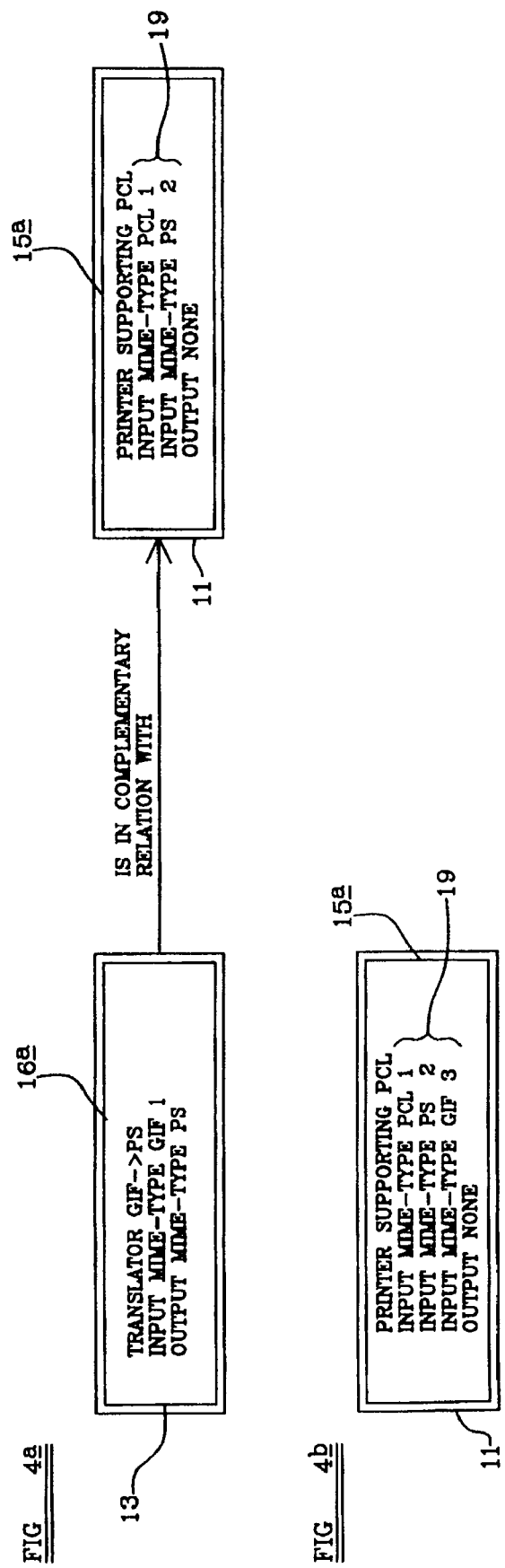

METHOD OF BROKERING NETWORK SERVICES

DESCRIPTION OF INVENTION

This invention relates to a method of brokering network services and a broker for brokering network services.

BACKGROUND OF THE INVENTION

The connection of computers and other devices to form networks is well known and wide spread. Such networks provide substantial advantages in enabling computers and their users to communicate and to access and share, resources such as information stores, printers and so forth. A requirement is that an entity such as a computer or other device connected to the network should be aware of or able to identify other network entities with which it can communicate and whose capabilities are available for use.

For relatively small and stable networks, it is known to provide each entity with a network address and to provide that address to other entities. For example, a personal computer may be manually provided with the network address of a printer and set to send all printer jobs to that network address. This technique is however unsuitable for large networks with a very large number of entities connected to the network, or to ad hoc or changeable networks.

A number of protocols or techniques have been developed to enable network entities to identify other entities with desirable characteristics. For example, a personal computer may wish to identify a colour printer able to print a particular type of graphics file. The techniques may broadly be characterised as "look up" techniques in which a directory of entities and their associated capabilities is maintained, and "discovery" in which an entity actively locates or seeks another entity having a desired capability. It is also known to use a combination of "look up" and "discovery" techniques.

Because the terminology in this technical field is not consistent between protocols and applications, the following terms will have the following meaning herein;

"service"—refers to a function or resource provided by a network entity and available over the network to other entities. There clearly need not be a one-to-one relation between services and entities. For example, a combined scanner, printer and fax machine would be a single entity but provide three distinct services.

"entity"—refers to any device or application which provides a service and/or which accesses services over a network. An entity may thus be a physical device, such as a printer, or may be a software application.

"client"—refers to an entity which wishes to access or invoke a service.

"broker"—as a verb means to offer a service which is performed by another network entity, and as a noun refers to any entity which offers a service performed by another entity.

In the "look up" technique, a broker maintains a directory of services available over a network. To find a required service, a client sends a request to the broker identifying the required capabilities. The broker then searches the directory for a service matching the required capabilities and answers the request. Examples of protocols which uses this technique are the lightweight directory access protocol (LDAP) and the CORBA trader service. Such protocols are however computationally heavy and difficult to maintain and install. They do have the advantage that they are able to respond to specific requests for a logical combination of desired capabilities or other criteria. By organising the directory in a hierarchical or other topology, look up protocols may provide scaleability over a wide range of network sizes. As an extreme example, the Internet domain name service (DNS) is a look up system organised as a hierarchy of servers which scale up to the Internet as a whole. Such protocols do not however support the spontaneous addition or removal of entities to and from the network, and are also not appropriate for "ad hoc" networks.

To address these shortfalls, discovery protocols have been devised. In a discovery protocol, an entity advertises its capabilities, for example by multicast over a network, and the capabilities are cached or otherwise recorded by other entities. When a client requires a particular function or resource, it can send a request directly to the service using the cached information. A client may also advertise a request setting out required capabilities, and a service matching those capabilities may respond to the request. As such, no separate directory or broker is required and such a protocol is computationally light and responsive to change in the network.

An example of a discovery protocol is the simple service discovery protocol (SSDP) which has been incorporated into Microsoft Universal Plug-and-Play protocol (UPnP). In SSDP, services multi-cast their capabilities over a allocated SSDP multi-cast channel/port using the HTTP UDP protocol. Services are identified using a universal resource identifier (URI) which identifies the service and its capabilities, and a unique service name (USN). The USN which is a unique identifier such as a universal unique identifier (UUID). SSDP uses both methods of discovery described above. When a service is first connected to the network, it announces its capability and USN which may then be cached by listening entities whilst clients may also transmit a search request using a URI to identify the service type required. Although SSDP is an extremely simple and lightweight protocol, it does not allow clients to search other than by using the various service type identifiers. There is no entity corresponding to a broker and the protocol does not perform any brokering as defined above.

A more sophisticated protocol with discovery, together with a more sophisticated search capability and an optional directory capability is "Salutation". In the Salutation protocol one or more services are connected to a corresponding Salutation Manager. Each Salutation Manager stores information about services registered with that Salutation Manager. When a client wishes to locate a service having a given set of capabilities, it sends a request to its corresponding Salutation Manager, which contacts other Salutation Managers to identify services requested with those managers which have the required capability. When a service having the required capability is found, the or each Salutation Manager then establishes a service session to connect the client and service. The Salutation Managers are intended to be independent of any particular network protocol, and communications between Salutation Managers across a network are handled by a network-specific transport management layer. As specified in the Salutation architecture specification, a Salutation Manager may store information about services registered in other Salutation Managers to allow the Salutation Manager to maintain a directory of services that are important to local services or clients. It is even envisaged that one Salutation Manager in the network may be designated as a directory responsible for finding and registering all compatible services, and all client requests would be directed towards this Salutation Manager which would act as a broker.

A Java based solution, JINI, is also known which is a combination of look up and discovery techniques. A service, on connection to the network, will locate a look up service. Once the service has identified the look up service, it registers its capabilities with the look up service. A client wishing to identify an appropriate service will send a request to the look up service.

A problem with each technique described above is that the description of each service is essentially static. The information available on each service, whether held by a broker or advertised by the service, itself takes no account of other services available on the network. Where a client wishes to carry out a function which uses a number of resources which are provided by separate services, the client must discover or look up those services separately and invoke them separately.

An aim of the invention is to provide a new or improved lightweight method of brokering services provided over a network.

SUMMARY OF THE INVENTION

According to a first aspect of the invention, we provide a method of brokering network services by identifying a service which is complementary to a first service, the first service having an associated first service description comprising first service identification information identifying the service offered and first interface type information, the first interface type information comprising at least one of an input format accepted by the first service and an output format generated by the first service, the method comprising the steps of identifying a second service having an associated second service description comprising second service identification information identifying the service offered and second interface type information which is complementary to the first interface type information, and modifying the first service description in accordance with the second service description.

Some or all of the services on a network are able to identify complementary services and modify their own description in accordance with an identified complementary service thus in effect brokering the identified service. To invoke both services, the client need send only a single request to the first service.

The step of identifying a second service may comprise comparing the first interface type information and second interface type information, wherein the first service and second service are complementary if an input format accepted by the first service matches an output format generated by the second service or if an input format accepted by the second service matches an output format generated by the first service.

If an input format accepted by the first service matches an output format generated by the second service the step of modifying the first service description comprises adding an input format accepted by the second service to the first interface type information.

If an input format accepted by the second service matches an output format generated by the first service, the step of modifying the first service description comprises adding an output format generated by the second service to the first interface type information.

The step of modifying the first interface type information may comprise adding weight information indicating that an input format or output format corresponds to a second service.

The step of modifying the first service description may comprise generating a complementary service table identifying the second service and interface type information corresponding to that service.

The step of modifying the first service description may comprise modifying the first service identification information in accordance with the second service identification information.

The step of identifying a second service may comprise receiving the second service description over a network.

The step of making the first service description available over a network.

The step of receiving a service request from a client at the first service, comparing the client request with the first interface information and invoking the second service.

The step of transmitting the client request from the first service to the second service, receiving a response from the second service and invoking the first service in accordance with the response.

The step of invoking the first service in accordance with the client request, generating an output and transmitting the output to the second service.

According to a second aspect of the invention, we provide a broker for brokering network services, the broker being associated with a first service provided on the network, the broker comprising a first service description comprising first service identification information identifying the service offered and first interface type information, the first interface type information comprising at least one of an input format accepted by the first service and an output format generated by the first service, the broker being operable to identify a second service having an associated second service description comprising second service identification information identifying the service offered and second interface type information which is complementary to the first interface type information, and modify the first service description in accordance with the second service description.

BRIEF DESCRIPTION OF FIGURES

An embodiment of the present invention will now be described by way of example only with reference to the accompanying drawings wherein;

FIG. 2 is a diagrammatic illustration of complementary and non-complementary services.

FIG. 3a is an illustration of a method embodying the present invention.

FIG. 3b is an illustration of a method embodying the present invention following the steps of FIG. 3a.

FIG. 4a is an illustration of a further method embodying the present invention, and FIG. 4b is an illustration of a further method embodying the present invention following the step of FIG. 4b.

DESCRIPTION OF THE PREFERRED EMBODIMENTS

Figure 1:
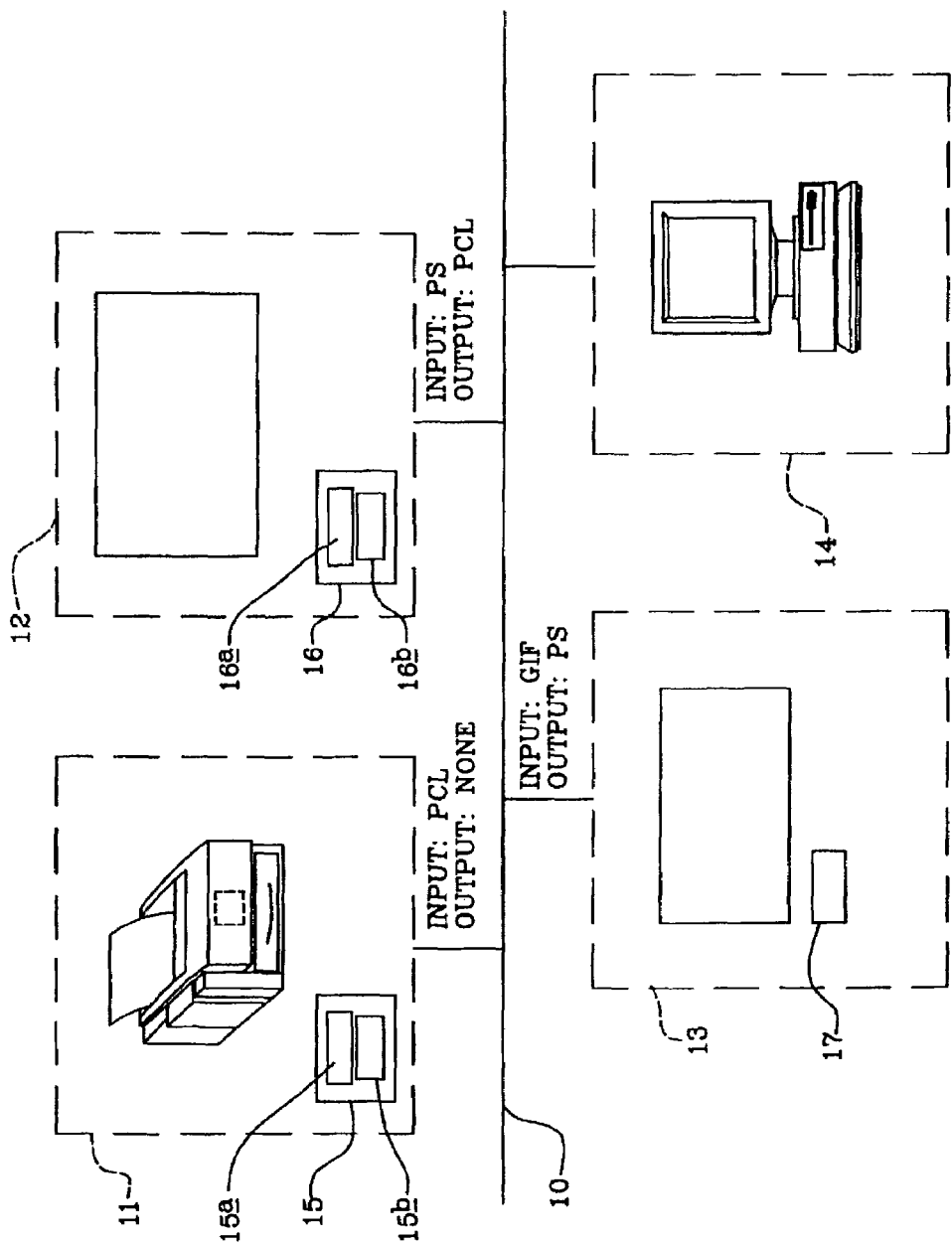
FIG. 1 is a diagrammatic illustration of a network comprising services embodying the present invention.

Referring to FIG. 1, a network 10 is shown to which are connected four entities 11, 12, 13, 14. In this example, the entity 11 is a physical device comprising a printer, entities 12 and 13 are applications in this example file translators, and entity 14 is a personal computer. The printer 11 and the translator 12 are provided with a broker 15, 16 respectively in accordance with the present invention. Each broker 15, 16 comprises a service description 15a, 16a and a complementary service list 15b, 16b. Entity 13 is provided with a service description 17, since the translator 13 provides a service accessible via the network 10 but does not have a broker. The PC 14 does not provide a service and so does not have a service description.

The service description 15a, 16a, comprises service identification information, stating what service is provided by the entity and interface information, setting out the input format or data of file type accepted by the service and/or the output format generated by the service. The service description 15a, 16a, will also include a indication of the location of the service. The complementary service list 15b, 16b, comprises a table setting out an input or output format, the corresponding service used and a location for that service.

In the present example, a complementary relation is said to exist between two services A and B where the output format of A matches the input format of B. Services A and B are said to be complementary services. Thus in the example of FIG. 2a, a PostScript to PCL translator with input format mime-type PostScript and output format mime-type PCL is complementary to a printer supporting PCL with input format mime-type PCL. An MPEG viewer service with input format mime-type MPEG and no output is not in complementary relation with a printer supporting PCL with input format mime-type PCL and no output.

To provide lightweight brokering by establishing a community of complementary devices, the broker 15, 16 will modify the service description 15a, 16a, and complementary service list 15b, 16b in response to the presence of complementary services connecting to the network 10.

The method of brokering services on the network 10 will now be described with reference to FIG. 3.

First, each broker 15 must be aware of services provided by other entities connected to the network 10. In accordance with the SSDP specification for example, each entity on being connected to the network 10 will transmit a presence announcement over a specified multi-cast channel or port. The presence announcement will include a unique service identifier, for example a universally unique identifier (UUID), information corresponding to the service description specifying the service, interface information, and a location of that service. The multi-cast will be received by all entities attached to the network 10 and able to receive messages on the multi-cast channel.

On receipt of the presence announcement, the broker 15, 16 will compare the interface type information received in the presence announcement with the interface information in the service description 15a, 16a. If the interface type information included in the presence announcement indicates that the service making the announcement is a complementary service, the broker 15, 16 will add the service to its associated complementary service list and will modify its interface information to match that received in the presence announcement. For example in the network of FIG. 1, the printer 11 may have a service description as follows;

| Service identification information: | printer supporting PCL |
|---|---|
| Interface information | input: mime-type PCL |
| | output: none. |

As shown in FIG. 3a, on receipt of a presence announcement from the translator 12 including the service description information 16a, the broker 15 compares the interface information in the service description 15a. The service description 15a indicates that the output of the translator 12 is PCL which matches the input type of the printer 11, and hence the printer 11 and translator 12 are complementary. As shown in FIG. 3b, the broker 15 will modify the service description 15a to read;

| Service identification information: | printer supporting PCL |
|---|---|
| Interface information | input: mime-type PCL |
| | input: mime-type Post-Script |
| | output: none. |

That is, the broker 15 has added the input format type of the translator 12 to the interface information in the service description 15a. It might also be envisaged that the broker 15 could change the service description type to for example "printer supporting PCL and PostScript". The broker 15 will receive the service description 17 from the translator 13, but since the printer 11 and translator 13 are not complementary in that there are no matching input and output formats, the broker 15 will not modify the service description 15a or change the complementary service list 15b.

As shown in FIG. 3a, the broker 16 will perform the same analysis and will identify the translator 13 as a complementary service to the translator 12 in that the output type of the translator 13 matches the input format type of the translator 12. The broker 16 will modify the service description 16a in a similar manner to that described above as shown in FIG. 3b to include the input format GIF in the interface information for the translator 12, and will modify the complementary service records 16b to identify the translator 13.

Thus, when a client system, for example the personal computer 14 wishes to print a document in PostScript format, the personal computer 14 can transmit an appropriate discovery request specifying that it requires a printer able to print PostScript documents. The discovery may be performed in any way as desired, for example a discovery request may be transmitted as an SSDP multi-cast over the network 10, or the printer 11 may announce its revised service description over the multi-cast channel which is received and cached by the personal computer 14 in accordance with the SSDP specification. The personal computer 14 transmits the Post Script document to the printer 11. The broker 15 will receive the PostScript document, transmit it to the translator 12 over the network 10 and receive the translated document in PCL format from the translator 12, which will then be printed by the printer 11.

In this manner, a brokering operation has been performed which is transparent to the client system, the personal computer 14. As far as the client system 14 is aware, it has simply transmitted a PostScript document to a PostScript-capable printer. No management or manual installation has been needed, since the broker 15 has automatically detected a complementary service, modified the service description 15a of the printer 11 and has invoked the translation service 12. The service may be invoked by any appropriate method, for example using the Simple Object Access Protocol (SOAP).

As described above, the brokers 15 and 16 searched for "backward" complementary relationships in that they identify services which have an output format which matches the brokers associated service's input format. It will be apparent that complementary relations could be chosen to be forward complementary i.e. that the broker would identify services which have an input format which match the output format of the broker's associated service. In this example, the broker 16 would modify the service description 16a and complementary service records 16b of the translator 12 to include the capabilities of the printer 11. It would even be possible to search for both forward and backward complementary relations, but this would have a consequent risk of duplication of complementary services, i.e. the broker 15a would modify the service description 15a and complementary service record 15b to take account of the capabilities of the translator 12, and the broker 16 would modify the service description 16a and complementary service record 16b to take account of the printer 11. Both service descriptions 15, 16 would then appear to offer a printer which accepted PostScript files.

It could further be envisaged that the process of identifying complementary services is repeated, for example that two or more identification steps are performed. As discussed above with reference to FIG. 3b, the broker 15 has amended the service description 15a to specify that the printer 11 accepts as an input format mime-type PostScript, and the broker 16 has modified the service description 16a to add that the translator 12 accepts the input format mime-type GIF files. As shown in FIG. 4a, if the broker 15 searches again for "backward" complementary services, it would identify that the translator 13 is now a complementary service to the printer 11, since the printer 11 now accepts PostScript files and the translator 13 outputs PostScript files. The broker 15 will modify the service description 15a and complementary service record 15b as described above to include the input format type mime-type GIF as shown in FIG. 4b.

Where several such steps for identifying complementary services are performed, it could potentially lead to a very large number of possible combinations of complementary devices, and so multi-step searches are preferably limited by appropriate rules. For example, a broker might not search for complementary services matching a particular input type listed in its interface information when that input type is itself brokered. In the above example, the broker 15 would not search for services having an output format of mime-type Post Script because this input is brokered, that is provided by a complementary service, the translator 12. However, where the broker 16 has identified the translator 13 as a complementary service with the translator 12 and offers the input formats of mime-type GIF and mime-type PostScript, the broker 15 may read the service description 16a and add mime-type GIF and mime-type post script to its service description 16a. In this way, the complementary services are established so that the printer is able to print from each of the available file types but without there being duplication of brokered services.

A further method for controlling the number of brokered services may be to tag or weight, in this example, the input formats offered by a service which are brokered. Thus, in the multi-step example, the printer could tag input formats mime-type PostScript and mime-type GIF to show that these capabilities are offered through a brokered complementary service. A client 14 would then be aware that the complementary service may not be available, for example in the event of a failure of the translator 12 of which the printer 11 is unaware. As discussed above, when making multiple passes to identify complementary services, a broker may be set not to search brokered input types.

Instead of simple tagging, weights may be attached to input types as shown at 19 in FIG. 4. The weighting would indicate the extent to which a service is brokered, for example the number of services required to provide the offered capability or function. As shown in FIG. 4, the service description 15a states that the printer 11 accepts input mime-type PCL with weight 1, input mime-type PostScript with weight 2 and input mime-type GIF with weight 3. The weight 19 indicates the number of services used to perform a function e.g. three entities, the translators 12 and 13 and the printer 11 are required to perform the function of printing GIF documents. The broker 15 may then use this weight to assess the most efficient manner of providing a function. For example if a further server comprising a GIF to PCL translator were to be made available on the network 10 and announce its presence, the broker 15a would detect the service as a complementary service and add an input of mime-type GIF with weight 2 to the service description 15a. The input of mime-type GIF with weight 3 could then be removed from the server description 15a and complementary service list 15b. Alternatively, the broker 15 could retain the input format mime-type GIF with weight 3 and on receipt of a GIF file attempt to invoke services offering GIF translation in ascending order of weight.

A broker may have a specified weight limit, for example that only interface types with a weight of 3 or lower should be offered.

Similarly, a client 14 may be offered a number of services meeting a desired capability, and may preferentially invoke those services with the lowest weight.

A further technique for controlling the number of complementary services when performing multi-step searching is to add a flag to the service description 15a, 16a, 17a, specifying whether or not the corresponding entity 11, 12, 13 comprises a broker and supports complementary brokering. The broker 15, 16 may then be set to search for services complementary to a brokered interface type only if the service providing that interface type does not itself support brokering.

In the example of FIG. 4a, the printer 15 searches for services which are in complementary relation to the brokered input mime-type PostScript. If the service description 16a were to be tagged to show that the broker 16 supports complementary brokering, then the broker 15 would not search for services with an output of mime-type PostScript. Instead, the broker 16 of the translator 12 would detect the translator 13 as a complementary service as shown in FIG. 3 and amend the service description 16a accordingly. The broker 15 would then amend the service description 15a to take account of the revised service description 16a. The service description 15a would still have the same list of weight input-types as shown in FIG. 4b, but the duplication of work involved in both the broker 15 and broker 16 searching for services complementary to the input format mime-type PostScript would be avoided.

To enable multi-step searching to identify complementary devices, it is necessary for each service to make its revised service description available on the network 10. In the example used in this description of SSDP, there is no provision for a device to make any multi-cast announcement of its availability other than when first available on the network. However, it might be envisaged that when a device amends its service description 15a to add a new interface type, the service makes a multi-cast over the network 10 announcing its revised service description, and a broker on the network 10 may then detect the revised service description and operate accordingly as set out above. Alternatively, or in addition, when a broker amends a service description to add a new interface type, the service may transmit a request over the network 10 to identify services which are complementary to the new input format or output format type and build a complementary device list accordingly. The step of sending a multi-cast request to identify a service with a particular capability is in accordance with the SSDP specification.

In the SSDP, an entity which is being removed from the network transmits a multi-cast announcing that it will no longer be available. Brokers 15, 16 may receive such a multi-cast and amend the service description 15a, 16a and complementary service list 15b, 16b, to take account of such a multi-cast, deleting the service from the complementary service list 15b, 16b, and removing input types or output types brokered through that service from the service description 15a, 16a.

Although the present example has been discussed with relation to SSDP, it will be apparent that this lightweight brokering method may be used with any appropriate discovery system as desired. It might also be envisaged that the technique be used with a brokering system which uses a directory, where a broker associated with a service is able to intergate the directory to identify complementary services. Although in the present example, each broker is associated with a service, it might be envisaged that a stand-alone broker may be used which assembles a complementary service list. The stand alone broker would thus appear transparently on the network as one or more services, and may be addressed by a client 14 as if it were a service.

It will be apparent that such brokering can be used with any network transport protocol as desired.

The method of brokering complementary services described herein thus has the advantages that it is computationally lightweight in that each broker itself may be a relatively simple program or other software element. No management of the brokering is required since the identification and offering of complementary services is performed automatically in response to services advertising their presence and capability on the network. The method is robust in that individual brokers are distributed over a number of entities in a network and the removal or addition of a broker and/or a service is accommodated automatically.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of brokering network services by identifying a service which is complementary to a first service,
   the first service having an associated first service description (15a, 16a,) comprising first service identification information identifying the service offered and first interface type information, the first interface type information comprising at least one of an input format accepted by the first service and an output format generated by the first service,
   the method comprising the steps of;
   identifying a second service having an associated second service description (15a, 16a, 17) comprising second service identification information identifying the service offered and second interface type information which is complementary to the first interface type information, and
   modifying the first service description (15a, 16a,) in accordance with the second service description (15a, 16a, 17).

2. A method according to claim 1 wherein the step of identifying a second service comprises comparing the first interface type information and second interface type information, wherein the first service and second service are complementary if an input format accepted by the first service matches an output format generated by the second service or if an input format accepted by the second service matches an output format generated by the first service.

3. A method according to claim 2 wherein if an input format accepted by the first service matches an output format generated by the second service the step of modifying the first service description comprises adding an input format accepted by the second service to the first interface type information.

4. A method according to claim 2 wherein if an input format accepted by the second service matches an output format generated by the first service, the step of modifying the first service description (15a, 16a,) comprises adding an output format generated by the second service to the first interface type information.

5. A method according to claim 3 wherein the step of modifying the first interface type information including adding weight information indicating that an input format or output format corresponds to a second service.

6. A method according to claim 1 wherein the step of modifying the first service description comprises generating a complementary service table identifying the second service and interface type information corresponding to that service.

7. A method according to claim 1 wherein the step of modifying the first service description comprises modifying the first service identification information in accordance with the second service identification information.

8. A method according to claim 1 wherein the step of identifying a second service comprises receiving the second service description over a network.

9. A method according to claim 1 comprising the step of making the first service description available over a network.

10. A method according to claim 1 comprising the steps of receiving a service request from a client at the first service, comparing the client request with the first interface information and invoking the second service.

11. A method according to claim 10 comprising the steps of transmitting the client request from the first service to the second service, receiving a response from the second service and invoking the first service in accordance with the response.

12. A method according to claim 10 comprising the steps of invoking the first service in accordance with the client request, generating an output and transmitting the output to the second service.

13. A broker (15, 16) for brokering network services, the broker (15, 16) being associated with a first service provided on the network (10),
   the broker comprising a first service description (15a, 16a,) comprising first service identification information identifying the service offered and first interface type information, the first interface type information comprising at least one of an input format accepted by the first service and an output format generated by the first service, the broker being operable to identify a second service having an associated second service description (15*a*, 16*a*, 17) comprising second service identification information identifying the service offered and second interface type information which is complementary to the first interface type information, and modify the first service description in accordance with the second service description.

* * * * *